United States Patent [19]

Muderlak

[11] Patent Number: 5,593,126
[45] Date of Patent: Jan. 14, 1997

[54] SEAT POST BAG CLIP

[75] Inventor: Kenneth J. Muderlak, Shorewood, Wis.

[73] Assignee: Trek Bicycle, Corp., Waterloo, Wis.

[21] Appl. No.: 547,067

[22] Filed: Oct. 23, 1995

Related U.S. Application Data

[62] Division of Ser. No. 218,572, Mar. 28, 1994, Pat. No. 5,496,089.

[51] Int. Cl.⁶ ...................................................... A47G 1/10
[52] U.S. Cl. ........................ 248/316.7; 224/427; 224/547; 297/188.08; 297/188.12; 297/188.13
[58] Field of Search ......................... 297/188.08, 188.12, 297/188.13, 195.1; 403/388, 389, 391; 224/32 R, 39, 275, 427, 431, 438, 447, 564, 547; 248/316.7

[56] References Cited

U.S. PATENT DOCUMENTS

| | | | |
|---|---|---|---|
| 1,579,553 | 4/1926 | Ludlow | 224/547 X |
| 3,844,000 | 10/1974 | Hedu | 24/615 |
| 4,566,617 | 1/1986 | Jackson | 224/275 |
| 4,577,261 | 3/1986 | Tsuyama | 362/72 |
| 4,660,793 | 4/1987 | Mark | 248/316.7 X |
| 4,908,917 | 3/1990 | Kazle | 24/615 |
| 4,957,227 | 9/1990 | Trimble | 224/32 R X |
| 5,170,981 | 12/1992 | Lin | 224/39 X |
| 5,190,345 | 3/1993 | Lin | 297/188.12 |
| 5,383,588 | 1/1995 | Kazel | 224/547 X |
| 5,395,017 | 3/1995 | Naughton | 224/39 |
| 5,427,562 | 6/1995 | Hwang | 24/615 X |

FOREIGN PATENT DOCUMENTS

| | | | |
|---|---|---|---|
| 566857 | 10/1993 | European Pat. Off. | 224/39 |
| 361122052 | 6/1986 | Japan | 224/547 |
| 2231313 | 11/1990 | United Kingdom | 224/32 R |

Primary Examiner—Peter M. Cuomo
Assistant Examiner—David E. Allred
Attorney, Agent, or Firm—Lee, Mann, Smith, McWilliams, Sweeney & Ohlson

[57] ABSTRACT

A clip attaches accessories for bicycles using a resilient leaf biased into engagement with a receiver mounted on the accessory, and released by downward actuation to disengage a pawl from the receiver, the assembly preferably being mounted on an integral seat post cap having mounting ears.

12 Claims, 3 Drawing Sheets

SEAT POST BAG CLIP

This application is a division of Ser. No. 08/218,572 filed Mar. 28, 1994, now U.S. Pat. No. 5,496,089.

SUMMARY OF THE INVENTION

1. Field of the Invention

The invention relates to a clip for attaching accessories for bicycles and more specifically to attachments for accessories such as tool bags water bottle cages compressed gas cylinders for reinflating tires, U-style lock holders, bicycle tire pumps or the like in a secure and convenient manner proximate to the rider's seat or saddle.

2. Background of the Invention

A clip includes the mounting cleat; a tab with a resilient leaf portion; a latch or pawl; and an actuator for gripping by the rider's fingers to bias the tab. The clip forms a male portion which engages a generally rectangular and generally tubular receiver. The tab passes completely therethrough the pawl engaging a corresponding rearward edge of the receiver. The resilient leaf biases the pawl upward into engagement with the rearward edge of the receiver in the ordinary or locked position. There is some spring pressure for an interference fit against the edge so the cargo bag does not rattle. The receiver is affixed to the top of a cargo bag but may be affixed to other bicycle accessories e.g. tool bags; water bottle cages; compressed gas cylinders for reinflating tires; U-style lock holders; bicycle pumps; or the like.

The operation will be described with reference to a cargo bag, however, the receiver mounted to the cargo bag could be mounted, if desired on another accessory or a bracket or cage for holding items such as tool bags, water bottle cages, compressed gas cylinders for reinflating tires, U-style lock holders, bicycle pumps, or the like. The bag is released and removed from the bicycle by the rider manipulating the actuator. Since the tab passes entirely through both the receiving opening and the exit opening in the receiver tube, this is accomplished easily by the rider with one hand.

The clip is molded from an engineering plastic and the optimum configuration utilizes a web with a plurality of reinforcing flanges projecting downwardly therefrom. This provides, in addition to the properties dispersing stress on the structure when biased and a saving in materials, the additional benefit of providing the requisite thickness to enable the clip to be easily manually inserted even by a rider while riding and manipulating the apparatus behind his or her back with one hand.

In the preferred embodiment, the apparatus uses a special seat post having a clamp cap which clamps the rails of a typical bicycle seat in a known manner to hold the seat on the post. The seat post has rearwardly projecting ears on the seat post cap which enable a molded plastic clip to be bolted thereto.

In an alternative embodiment, a nil clamp uses a plate cap to clamp the clip directly to the seat rails. This embodiment enables firing the clip to any standard seat, regardless of whether the preferred seat post is used.

DESCRIPTION OF RELATED ART

Prior art clips typically use a pair of opposed spring elements on a tongue which is inserted into a receptacle, the opposed springs projecting laterally outwardly through apertures in the sides of receptacles. These must be squeezed together with substantially equal force on both sides by a finger and thumb and can become easily canter or skewed following the buckle or clip. In the invention, the rider can easily manipulate a single element against spring pressure to more easily remove the bag than prior art clips.

Prior art bicycle accessories typically use rigid clamps fired to frame tubes, bolt on brackets or straps fastened through a variety of methods such as tying, buckles, "D" rings or hook-and-loop (Velcro) fasteners. One quick removing bicycle bag attachment uses telescoping rods and tubes providing support only, which still relies on straps for securement. Another clip arrangement uses a clip hidden in the bicycle seat fastened embodiment, the clip having no actuator guiding arrangement, rendering it difficult to use one-handed, or while riding.

DETAILED DESCRIPTION OF THE INVENTION

Figure 1:
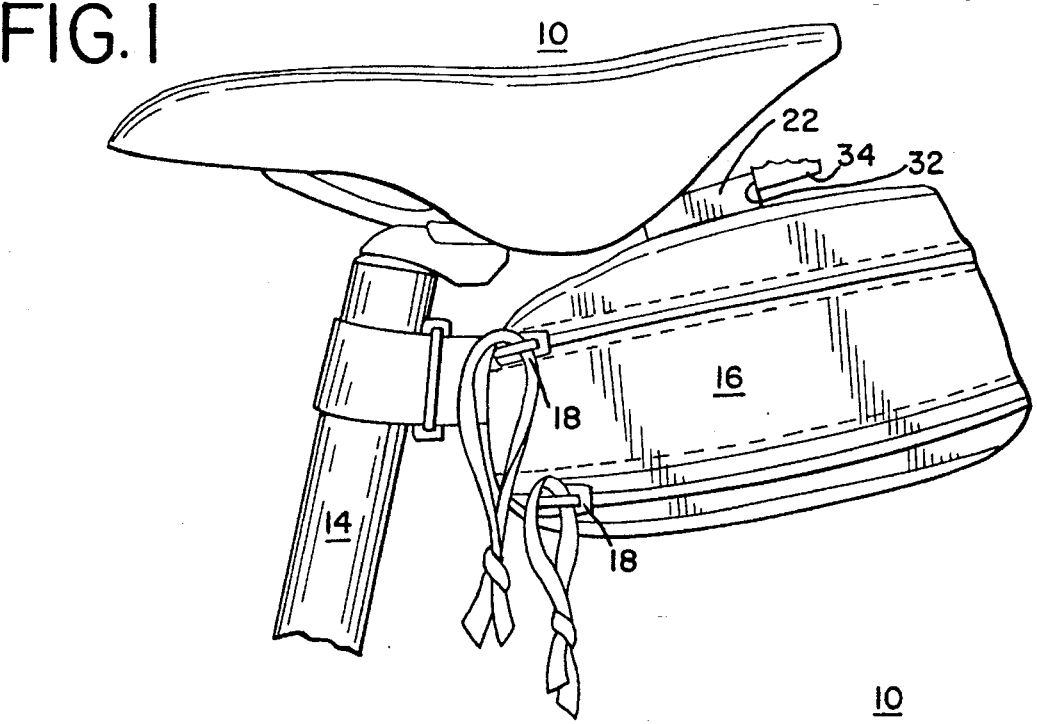
FIG. 1 is a side elevational view of the bicycle accessory clip.

A bicycle seat (10) supported by rails (12) is mounted to a generally cylindrically shafted tubular seat post (14). Other seat post supporting shaft cross-sections, such as elliptical sections, are known and these would not provide a departure from the present invention. The seat post provides structural support for the seat, or saddle, on the bicycle frame, not shown, such that a rider can sit on the seat while the legs are free to pedal. A cargo bag (16) having zippers (18) providing access therein and having an auxiliary strap (20) is primarily supported by a receiver (22) on a clip (24).

The clip (24) includes the mounting cleat (26) and a tab (28). The tab (28) has a resilient leaf (30) extending rearwardly from the cleat (26) to a latch or pawl (32) and then to an actuator (34) for gripping by the rider's fingers to bias the tab (28) downwardly to release the bag (16). The tab (28) forms a male portion which engages the receiver (22) which is made up in generally rectangular section from side, (35) top (36) and bottom walls (37).

Figure 4:
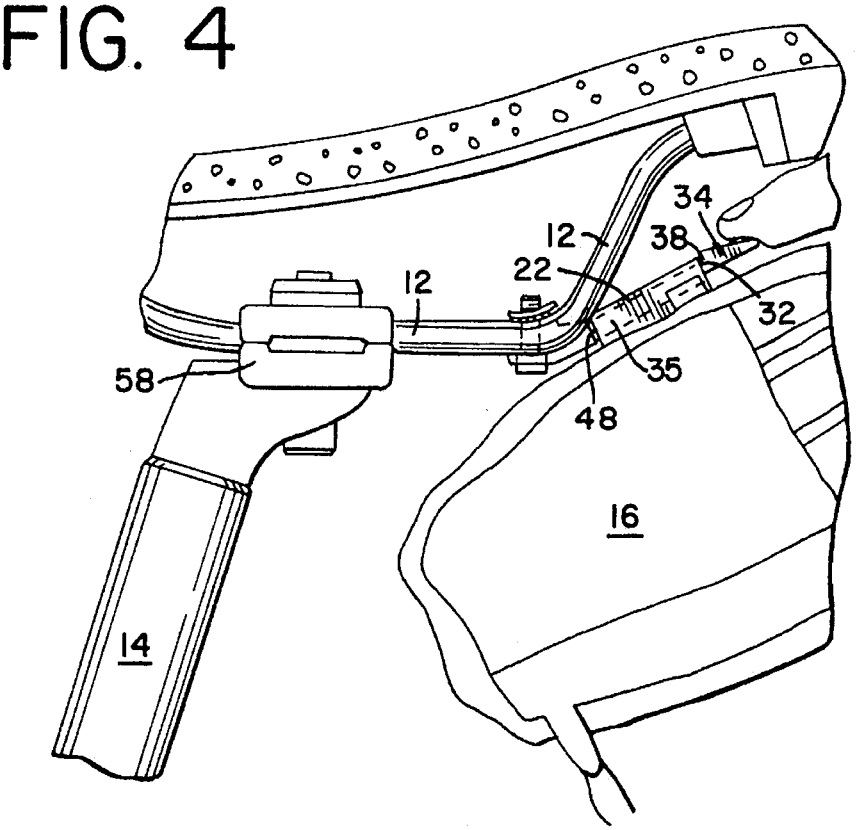
FIG. 4 is a sectional view of the rail mountable bicycle accessory clip.
Figure 5:
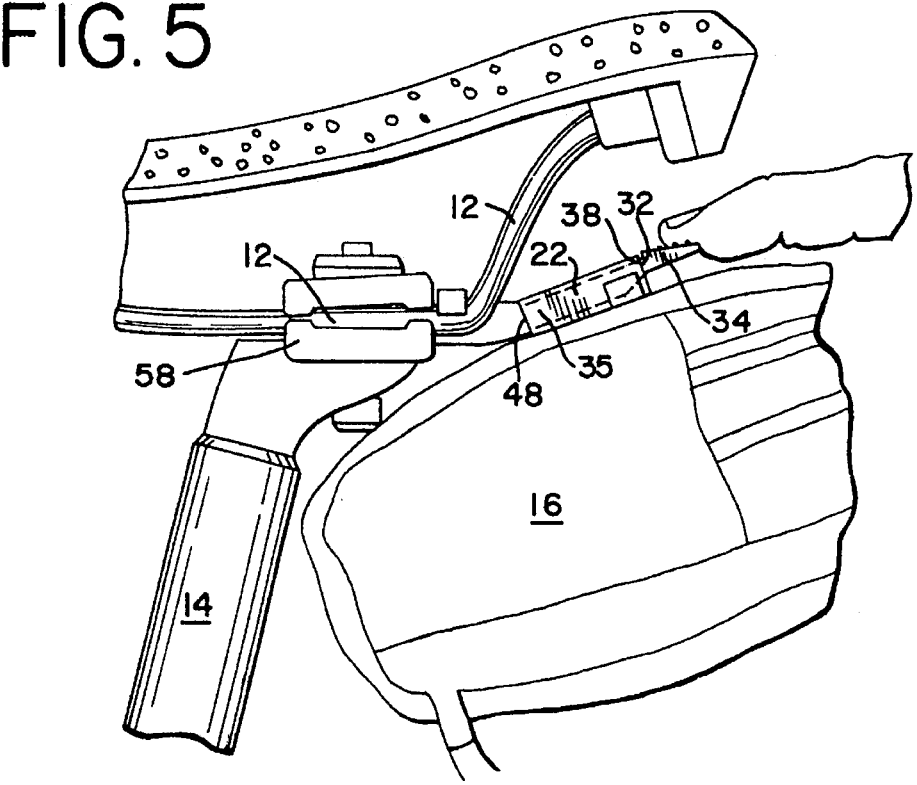
FIG. 5 is a sectional view of the seat post mountable bicycle accessory clip.
Figure 6:
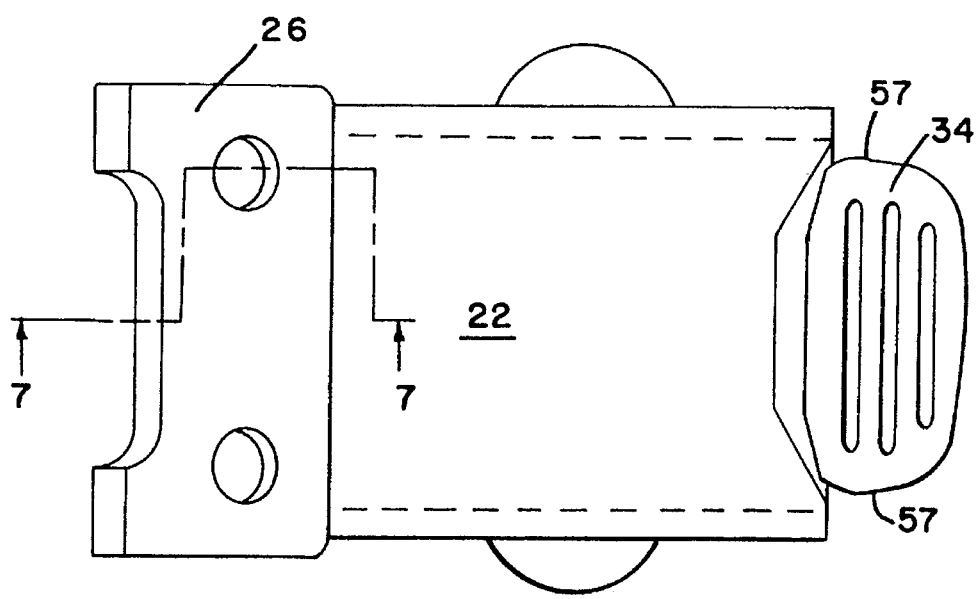
FIG. 6 is a top plan view of the bicycle accessory clip and receiver.

The tab (28) passes completely through the receiver (22). The pawl (32) engages a corresponding rearward edge (38) on the top wall (36) of the receiver (22). The resilient leaf (30) biases the pawl (32) upward into engagement with the rearward edge (38) of the receiver (22) in the ordinary or locked position. This is shown in FIG. 4 and FIG. 5. just prior to actuation by the rider. There is spring pressure biasing the pawl (32) to tightly fit against the edge (38) so the cargo bag (16) does not rattle.

The receiver (22) is affixed to the top of a cargo bag (16) but may be affixed to other bicycle accessories e.g. tool bags; water bottle cages; compressed gas cylinders for reinflating tires; U-style lock holders; bicycle pumps; or the like.

Figure 7:
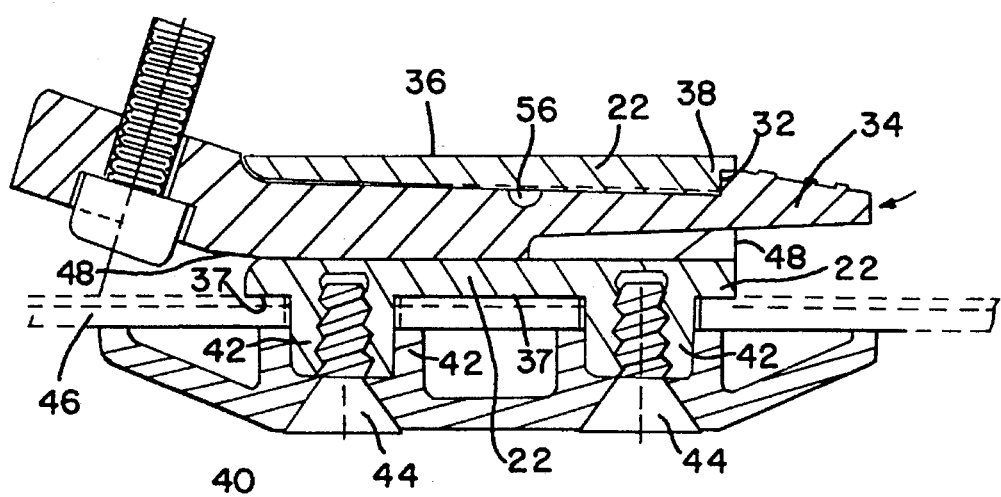
FIG. 7 is a sectional view of the bicycle accessory clip and receiver.

As shown in FIG. 7, the receiver (22) is mounted in the preferred embodiment to the cargo bag (16) through the attachment of a screw plate (40) to bosses (42) formed on bottom wall (37) using fasteners (44). In this embodiment screw plate (40) captures fabric (46) of bag (16) between screw plate (40) and bottom wall (37).

The operation will be described with reference to a cargo bag (16), although the invention is not limited to a cargo bag. Bosses (42) could be mounted, if desired, on another accessory or a bracket or cage for holding items such as tool bags, water bottle cages, compressed gas cylinders for reinflating tires, U-style lock holders, bicycle pumps, or the like, with or without screw plate (40) depending on the nature of the additional accessory.

As shown in FIG. 4 or FIG. 5, the bag (16) is released and removed from the bicycle by the rider manipulating the actuator (34) downward releasing pawl (32) from engagement with edge (38). The actuator (34) and pawl (32) pass entirely through both the receiving opening (46) and the exit opening (48) in the receiver (22) tube. The receiving opening (48) provides for the ingress of the tab and the exit opening (48) the egress of the pawl (32) and actuator (34). The entire receiver (22) and bag (16) attached thereto, can then be removed from the clip. This is accomplished easily by the rider with one hand due to the use of a single actuator (34), pawl (32) and edge (38) which is fixed to the bicycle.

The clip (24) is molded from an engineering plastic, preferably polycarbonate. Glass filled nylon, and delrin may also be used, as may other materials, even metals. The optimum configuration utilizes a web (50) with a plurality of reinforcing flanges (52) projecting downwardly therefrom. This arrangement resists load on the web (50) structure when the leaf (30) is biased, provides a saving in materials, and provides the requisite vertical thickness to enable the clip (24) to be easily manually inserted into receiver (22) even by a rider while riding and manipulating the apparatus behind his or her back with one hand.

Longitudinally extending from web (50) are side guides (54) which align and provide vertical and lateral support directing the receiver (22) onto the clip (24) and when in place insure the maximum contact between pawl (32) and edge (38) for security in retaining bag (16).

Guides (54) are relieved to define and enable movement of leaf (30) which has actuator (34) on its outward end. Leaf (30) is somewhat thinner than guides (54) and web (50) to better enable the flexibility needed to bias pawl (32) out of engagement with edge (38). At the base of leaf (30) in an alternative embodiment is lateral slot (56) which enhances the flexing of leaf (30). In the preferred embodiment this has been found non-essential.

Guides (54) co-act with the outer edges (57) of actuator (34) which, it will be noted, extend past the edges of leaf (30). These elements generally form a "Tee" shaped movable portion on the clip. This provides improved ease of entry of the clip (24) into receiver (22) which is particularly useful for one-handed or blind attachment, as well as an advantage in ordinary attachment. The use of the fixed male clip (24) with the actuator (34) in the configuration described, and receiver (22) mounted on the accessory is a significant improvement over the prior art which is exceedingly difficult to attach one handed, or while riding.

In the preferred embodiment, the apparatus uses a special seat post (14) having a clamp cap (58) which clamps the rails (12) of a typical bicycle seat to hold the seat on the post (14). The seat post (14) has rearwardly projecting ears (60) on the seat post (14) which enable the cleat (26) of the molded plastic clip (24) to be bolted thereto using mounting bolts or screws (62).

Figure 2:
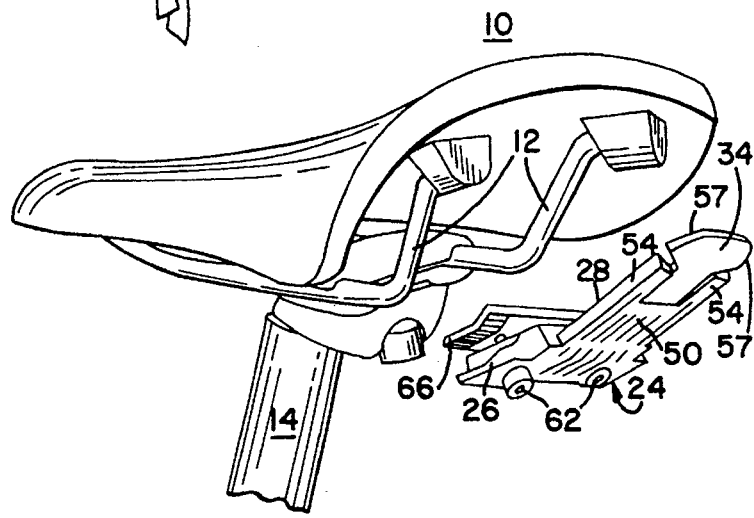
FIG. 2 is a rear perspective view of the bicycle accessory clip rail mountable embodiment, exploded to show the components.
Figure 3:
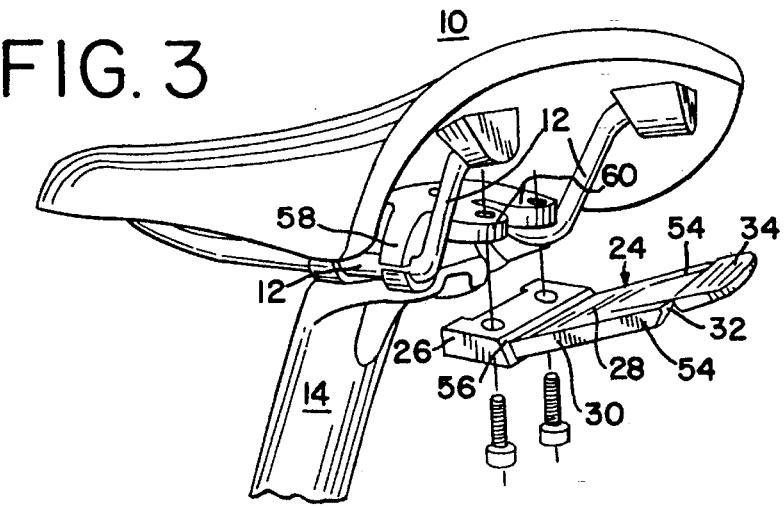
FIG. 3 is a rear perspective view of the bicycle accessory clip seat post mountable embodiment, exploded to show the components.

In an alternative embodiment, in FIG. 2, a rail plate cap (66) with bolts (62) clamps rails (12) against lateral projections (68) which extend from a modified cleat (70) to mount clip (24) directly to the seat rails (12). This embodiment enables fitting the clip (24) to any standard seat, regardless of whether the preferred seat post (14) and cap (58) is used.

In accordance with my invention, I claim:

1. A clip for mounting an accessory to a cycle seat assembly, said clip having a longitudinal axis extending from a first end to an opposite end, a lateral axis being generally horizontal normal to said longitudinal axis and a generally vertical axis comprising:

a tab with a mounting cleat at said first end, and a resilient leaf extending longitudinally outwardly therefrom toward said opposite end;

a pawl formed on said tab longitudinally opposite the mounting cleat at said opposite end;

an actuator for biasing the leaf;

a tubular receiver for receiving said tab, said receiver having a rearward edge;

a pair of side guides defining laterally outward portions of the tab;

said resilient leaf being defined by a plurality of slits disposed laterally inwardly of said side guides;

said tubular receiver defining an uninterrupted passage between opposite longitudinal ends with said rearward edge on one of said opposite ends of said receiver;

said resilient leaf biasing the pawl into engagement with the rearward edge of the receiver in a locked position, and said actuator biasing the leaf for release of the tab from the receiver when manipulated;

said actuator extending laterally outward beyond said slits to facilitate gripping by the user's fingers.

2. The clip according to claim 1, and said clip being mountable to said seat assembly;

said seat assembly including a structural post supporting seat rails;

said cleat being operatively connected to a cap for mounting said clip to said seat assembly;

said cap adapted to mount said seat assembly to said cleat.

3. The clip according to claim 1, said tab further comprising:

a web extending longitudinally from said cleat;

said web being relieved to define a first side guide, a second side guide and said leaf, with said leaf between said side guides;

said guides substantially rigidly aligning and stabilizing said receiver when said tab engages said receiver;

said leaf being biasable in a direction generally normal to said longitudinal axis.

4. The clip according to claim 2, and said cap further comprising one of a seat post clamp cap or a plate cap;

said rails comprising seat post rails for a bicycle seat; wherein said clip is adapted to selective mounting through using one of said caps either by direct mounting of said clamp cap to said seat post or by direct mounting of said plate cap to said rails.

5. The clip according to claim 2, said tab further comprising:

a web extending longitudinally from said cleat;

said web being relieved to define a first side guide, a second side guide and said leaf, with said leaf between said side guides;

said guides substantially rigidly aligning and stabilizing said receive when said tab engages said receiver;

said leaf being biasable in a direction generally normal to said longitudinal axis.

6. The clip according to claim 5, and said cap further comprising one of a seat post clamp cap or a plate cap;

said rails comprising seat post rails for a bicycle seat; wherein said clip is adapted to selective mounting through one of said caps through either direct mounting of said clamp cap to said seat post or by direct mounting of said plate cap to said rails.

7. An accessory holder for attaching and detaching an accessory to an object said accessory holder comprising:

means for mounting said accessory on a receiver;

means for supporting said receiver, said means for supporting said receiver being fastenable to said object;

said means for supporting further comprising, a mounting cleat for mounting said means for supporting on said object;

a tab extending longitudinally outwardly from said mounting cleat;

means for guiding said receiver into locked engagement;

said means for guiding comprising a pair of opposed side guides, said side guides being disposed such that said side guides define the laterally outward portions of said tab;

a resilient leaf defined by a plurality of slits disposed laterally inwardly of said side guides;

a pawl being operatively formed on said resilient leaf and an actuator for biasing said resilient leaf;

said actuator extending laterally outward beyond said slits to facilitate gripping by the user's fingers;

said receiver being an uninterrupted tubular member defining openings in opposite longitudinal ends;

said tab being engageably receivable in said receiver said receiver having a latching edge on one of said longitudinal ends of said receiver;

said pawl engaging said edge in a locked position; and said receiver being removable from said tab when said pawl and said edge are in an unlocked relative position.

8. The accessory holder of claim 7, said receiver further comprising:

means for locking said receiver to said means for supporting being formed and arranged on a portion of said means for supporting;

means for biasing said means for locking into engagement with said receiver and enabling actuation to an unlocked condition.

9. The accessory holder of claim 8, said receiver further comprising:

means for ingress of said means for supporting into said receiver;

means for egress of said portion of said means for supporting from said receiver;

whereby said means for biasing may be actuated by movement of said portion of said means for supporting.

10. The accessory holder of claim 7, said receiver further comprising:

a generally rectangular section tube having two ends;

said tube having an entry opening at a first end and an exit opening at a second end;

said second end having said edge;

said edge engaging said pawl for locking said receiver on said tab.

11. The accessory holder of claim 7, said accessory holder being adapted to be operatively connected to a seat formed with rails, said seat being mounted on a seat post by seat rails, said accessory holder further comprising:

means for guiding said receiver into lockable engagement;

means for locking said receiver to said means for supporting being formed and arranged on a portion of said means for supporting;

means for biasing said means for locking into engagement with said receiver and enabling actuation to an unlocked condition.

12. The accessory holder of claim 11, said means for supporting further comprising:

a mounting cleat adapted to be mounted to seat rails.

* * * * *